Patented Jan. 26, 1932

1,842,933

UNITED STATES PATENT OFFICE

BENJAMIN W. DEDRICK, OF STATE COLLEGE, PENNSYLVANIA

PROCESS OF RECOVERING PRODUCTS RICH IN MINERAL SALTS AND ENZYMES AND ALSO CONTAINING VITAMIN B

No Drawing.      Application filed April 30, 1929.  Serial No. 359,414.

This invention relates to improvements in the process of recovering a product rich in mineral salts and enzymes and also containing vitamin B. In the ordinary milling operations for making wheat flour, these mineral salts, enzymes, etc. are almost entirely removed in the process of grinding and bolting.

The object of this invention is to obtain from such residues comprising the bran, shorts and the fine red or gray feed middlings containing the cerealin, an extract to be used in the improvement of white bread in the way of taste or flavor, increasing its volume and giving more bread from a given weight of flour, and in general furnishing a better quality and a more healthy and nutritious loaf of bread by reason of restoring certain of the mineral salts, enzymes, etc. contained in these rejected residues, particularly those contained in the aleurone layer, the cells of which contain the cerealin but which are rejected in separating the residues from the flour in the milling process.

These substances not only improve the taste or flavor, volume, etc. of the finished bread when added to the flour or dough, but also increase its nutritional value and health giving properties by restoring the mineral salts or phosphates, iron, etc. required in the upbuilding of the human body.

My extract contains these very valuable food substances in their natural state as in the wheat itself but now free of the indigestible branny covering consisting chiefly of fiber or cellulose without food value. Furthermore these substances are not injured by being subjected to boiling or life destroying high temperatures, or by the use of any chemicals in the process of obtaining this extract or in its preparation.

In its final form, my product is an extract dried and then reduced to a fine powder to be used in bread and cake making, the preparation of breakfast foods, etc.

In my research work I have discovered that the different separates of the residue rejected in the process of flour making from wheat yield extracts differing somewhat in characteristics. Those from the large free flaky bran are lighter in color and milder in taste and fermentative action. Those from the shorts or coarser feed middlings containing most of the germ are of a darker amber or yellowish color with a somewhat bitter taste due to the germ, but possessing strong fermentative action. Those obtained from the finer red or gray feed middlings containing most of the cerealin constituent are light amber in color with a sweetish agreeable taste, and possess strong fermentative action.

I furthermore found that the steep water drawn from the bran mash, the shorts mash and the fine middlings mash varied in color, concordant with the finished powder heretofore mentioned. The water from the bran mash is somewhat whitish in color with a mild taste characteristic of starchy matter. The water from the shorts or germ mash is dark amber in color, more heavy and oily with a strong taste. The water from the fine middlings mash is light amber in color with a mild sweetish taste.

It is the extract from the fine middlings that I consider the most valuable for my purposes, but the large flaky bran extract may be incorporated with the fine middlings extract at once. The shorts or germ extract is steeped or washed once or twice, preferably with warm water to relieve it of the oily and discoloring matter improving the color and taste of the extract which may now be dried and if desired incorporated with the other two extracts.

The process of the manufacture of this extract which I call Vitenza is as follows: A quantity of bran and fine middlings approximately 150 pounds of the large bran and 100 pounds of the finer feed middlings or a total of 250 pounds (the coarser shorts being kept out for separate treatment) is put in a drum or cylinder, having revolving agitator arms. A quantity of warm water, which has been previously boiled and cooled to 100 degrees Fahrenheit, amounting to about 1000 pounds is allowed to flow into this drum or cylinder, after which the agitators are started and run for several minutes to thoroughly saturate the bran and middlings and then stopped. The bran and middlings are allowed to soak for about two hours and then agitated again for several minutes, followed by a rest of one or two hours more. It is then given a final stirring before emptying it into a tub or tank. The alternate stirring and then soaking while at rest loosens the flour, cerealin and other valuable substances clinging to the inner side of the bran and to the loose free shorts and middlings. These are rich in protein, enzymes and mineral salts. The mash is now put under a hydraulic or other press and then subjected to pressure by which the fluid containing suspended therein the food substances heretofore mentioned is squeezed out and then drawn off at the bottom of the tank. The fluid is next filtered through a sufficiently fine wire screen to remove the bran and other fibrous matter and run into the settling tank from which after three or four hours the excess fluid or clear water is siphoned off, or otherwise removed.

The substance or extract precipitated from or out of the solution is collected and placed in a shallow pan and then dried in an oven at somewhat less heat than 212 degrees Fahrenheit, preferably at about 180 degrees Fahrenheit. The dried material is then broken up and ground into a fine powder and sifted through a fine screen, the final yield being 50 to 70 pounds of this extract powder, depending on the character of the bran and middlings. Normally the color of the powder is creamy, but can be produced to be of lighter color.

The treatment of the part of the residue, about 80 pounds consisting of the germy shorts is identical, excepting that the substances remaining after the steep water has been drawn off is washed by filling the settling tank with pure fresh water and stirring the substances remaining therein thoroughly into this water. It is allowed to settle until clear and the water then siphoned off or otherwise removed. Another washing may follow. The substance or extract is now gathered in a shallow pan and dried in an oven, its further treatment being identical with that of the bran and middlings extract. The germ extract may now be combined with the extracts from the other two residues or kept by itself for special purposes.

The extract is a pure product from wheat only and in the process of obtaining and preparing this extract for use, no chemicals or chemical agents as acids or alkalies are employed; no high or killing temperatures are used that might destroy or devitalize enzymatic action so that the dried and finely powdered extract is a free and wholly natural agent, supplying the mineral salts, enzymes, etc. as they existed in the grain before grinding and processing flour.

The extract owing to its containing the substances obtained from the residue, particularly from the aleurone or cerealin layer rejected in the processing of flour imparts to the bread a more distinctive wheaty and palatable taste or flavor than bread without the use of the extract.

The extract also increases the digestibility and nutritive value and healthgiving properties of the bread since it contains protein, the mineral salts such as iron, phosphates, enzymes and vitamin B that are otherwise lost with the rejected bran, shorts and middlings. My extract contains these very valuable food and flavoring substances in their natural state free from the indigestible and branny covering, consisting chiefly of woody fiber or cellulose without food value. These substances furthermore are not injured by being subjected to boiling or life destroying high temperatures or by the use of any chemicals in the process of obtaining this extract or its preparation.

When a portion of the extract is put in a cup containing water, sugar and yeast, evidence of enzymatic action is observed within a few minutes. The liquid becomes light and foamy some ten or fifteen minutes before there is any evidence of such action in a cup containing merely yeast, sugar and water.

These substances heretofore mentioned as constituting the extract when added to the flour or dough to the extent of one and one-half to two per cent in the making of bread, shortens the time of rising from two to five minutes over the time without its use and yields approximately two to three and one-half per cent more bread by weight and three to five per cent more loaf volume.

This extract can be directly incorporated with flour, approximately two per cent being added, instead of being dissolved with the yeast, etc. when making bread. It can be used also in making ready to use breakfast foods with similar improved results as when used in bread and cake making.

I claim:

1. The process of obtaining from the residue left after making flour from wheat, useful substances, comprising mixing said residues with water and alternately agitating the mixture and allowing it to rest until the starch and the cerealin grains and other substances adhering to the bran and the cellulose fibers of said residue are loosened and freed therefrom; then pressing the resulting mash to separate the fluid carrying the starch and the cerealin grains and similar food substances; then allowing these suspended substances to settle; drawing off the supernatant water and finally drying the residue comprising said suspended substances.

2. The process of obtaining from the residue left after making flour from wheat, useful substances, comprising mixing said residues with water which has been boiled and cooled down to approximately 100° F., and alternately agitating the mixture and allowing it to rest until the starch and the cerealin grains and other substances adhering to the bran and the cellulose fibers of said residue are loosened and freed therefrom; then pressing the resulting mash to separate the fluid carrying the starch and the cerealin grains and similar food substances; then allowing these suspended substances to settle; drawing off the supernatant water and finally drying the residue comprising said suspended substances.

3. The process of obtaining from the bran and fine middlings of the residue left after making flour from wheat, useful food substances, comprising mixing said bran and fine middlings with water and alternately agitating the mixture and allowing it to rest until the starch and the cerealin grains and other substances adhering to the bran and fine middlings are loosened and freed therefrom; then pressing the resulting mash to separate the fluid carrying the starch and the cerealin grains and similar food substances; then allowing these suspended substances to settle; drawing off the supernatant water and finally drying this residue comprising said suspended substances.

4. The process of obtaining from the residue left after making flour from wheat, useful substances, comprising mixing said residues with water and agitating the mixture several minutes then allowing it to rest several hours, again agitating the mixture several minutes followed by another rest of several hours and finally again agitating it for several minutes by which treatment the starch and cerealin grains and other substances adhering to the bran and the cellulose fibres of said residue are loosened and freed therefrom; then pressing the resulting mash to separate the fluid carrying the starch and the cerealin grains and similar food substances; then allowing these suspended substances to settle; drawing off the supernatant water and finally drying the residue.

5. The process of obtaining from the residue left after making flour from wheat, useful substances, comprising mixing said residues with water which has been boiled and cooled down to approximately 100° F. and alternately agitating the mixture and allowing it to rest until the starch and cerealin grains and other substances adhering to the bran and the cellulose fibres of said residues are loosened and freed therefrom; then pressing the resulting mash to separate the fluid carrying the starch and the cerealin grains and similar food substances; then allowing these suspended substances to settle; drawing off the supernatant water and finally drying the residue.

6. The process of obtaining from the bran and fine middlings of the residue left after making flour from wheat, useful food substances, comprising mixing said bran and fine middlings with water and alternately agitating the mixture and allowing it to rest until the starch and cerealin grains and other substances adhering to the bran and fine middlings are loosened and freed therefrom; then pressing the resulting mash to separate the fluids carrying the starch and the cerealin grains and similar food substances; then allowing the suspended substances to settle; drawing off the supernatant water and finally drying the residue.

7. The process of obtaining from the residue left after making flour from wheat, useful substances, comprising mixing said residue with water and agitating the mixture about two minutes, then allowing it to rest about two hours, again agitating the mixture about two minutes followed by another rest of about two hours and finally again agitating it for about two minutes by which treatment the starch and cerealin grains and other substances adhering to the bran and the cellulose fibres of said residue are loosened and freed therefrom; then pressing the resulting mash to separate the fluid carrying the starch and the cerealin grains and similar food substances; then allowing these suspended substances to settle; drawing off the supernatant water and finally drying the residue.

8. The process of obtaining from the bran and fine middlings of the residue left after making flour from wheat, useful food substances, comprising mixing said bran and fine middlings with water and agitating the mixture about two minutes, then allowing it to rest about two hours, again agitating the mixture about two minutes followed by another rest of about two hours and finally again agitating it for about two minutes by which treatment the starch and cerealin grains and other substances adhering to the bran and fine middlings are loosened and freed therefrom; then pressing the resulting mash to separate the fluid carrying the starch and the cerealin grains and similar food substances; then allowing these suspended food substances to settle; drawing off the supernatant water and finally drying the residue.

BENJAMIN W. DEDRICK.